(12) United States Patent
Duhme et al.

(10) Patent No.: US 7,797,954 B2
(45) Date of Patent: Sep. 21, 2010

(54) COOLING SYSTEM, PARTICULARLY FOR A MOTOR VEHICLE, AND METHOD FOR COOLING A HEAT SOURCE

(75) Inventors: Markus Duhme, Osnabrueck (DE); Alfred Jeckel, Rottenburg (DE)

(73) Assignee: Daimler AG, Stuttgart (DE)

( * ) Notice: Subject to any disclaimer, the term of this patent is extended or adjusted under 35 U.S.C. 154(b) by 860 days.

(21) Appl. No.: 11/656,019

(22) Filed: Jan. 19, 2007

(65) Prior Publication Data
US 2007/0157647 A1 Jul. 12, 2007

Related U.S. Application Data

(63) Continuation-in-part of application No. PCT/EP2005/007692, filed on Jul. 15, 2005.

(30) Foreign Application Priority Data
Jul. 23, 2004 (DE) .................. 10 2004 035 879

(51) Int. Cl.
F25B 39/04 (2006.01)
F25D 17/02 (2006.01)

(52) U.S. Cl. .......................... 62/184; 62/185

(58) Field of Classification Search .............. 62/183, 62/184, 185, 196.4, 197, 323.3, 198; 165/43, 165/42; 237/2 A
See application file for complete search history.

(56) References Cited

U.S. PATENT DOCUMENTS 5,497,941 A 3/1996 Numazawa et al.
5,549,153 A 8/1996 Baruschke et al.
6,059,016 A * 5/2000 Rafalovich et al. ............ 165/41
6,640,889 B1 11/2003 Harte et al.
2002/0043413 A1 4/2002 Kimishima et al.
2002/0184908 A1* 12/2002 Brotz et al. ................. 62/259.2

FOREIGN PATENT DOCUMENTS

| DE | G 92 02 466.1 | 6/1992 |
|---|---|---|
| DE | 197 45 167 | 6/1998 |
| DE | 197 30 678 | 1/1999 |
| DE | 199 30 148 | 1/2000 |
| DE | 199 37 949 | 2/2001 |
| DE | 103 09 781 | 9/2003 |
| EP | 0 999 078 | 5/2000 |
| EP | 1 065 354 | 1/2001 |
| JP | 11 0402212 | 2/1999 |
| JP | 2002313441 | 10/2002 |
| JP | 2002 352866 | 12/2002 |

* cited by examiner

Primary Examiner—Chen-Wen Jiang
(74) Attorney, Agent, or Firm—Klaus J. Bach

(57) ABSTRACT

In a cooling system, particularly a cooling system for motor vehicles, including a cooling circuit and a refrigerating circuit which are coupled to one another via a refrigerant/coolant heat exchanger and a third medium/coolant heat exchanger arranged in the cooling circuit, a heat source to be cooled is arranged in the cooling circuit and means are provided for controlling the quantity of coolant flowing through the refrigerant/coolant heat exchanger.

4 Claims, 2 Drawing Sheets

COOLING SYSTEM, PARTICULARLY FOR A MOTOR VEHICLE, AND METHOD FOR COOLING A HEAT SOURCE

This is a Continuation-in-Part Application of pending International Patent Application PCT/EP2005/007692 filed Jul. 15, 2005 and claiming the priority of German Patent Application 10 2004 035 879.6 filed Jul. 23, 2004.

BACKGROUND OF THE INVENTION

The invention relates to a cooling system, particularly for a motor vehicle, coupled to a refrigerating circuit via a refrigerant/coolant heat exchanger and to a method for cooling a heat source by means of the cooling circuit.

Cooling systems of this type are used, for example, in motor vehicles with an electric drive (for example, with a fuel cell) or hybrid drive, in order to protect a battery functioning as an energy store against excessive heating. It is variously known, in this context, to cool the battery by means of a cooling circuit which functions at the same time as an air conditioning system for cooling supply air for a vehicle interior.

JP 2002 313 441 A discloses a cooling system in which the battery is cooled by means of circulating air which is itself cooled by a specific evaporator which is arranged, parallel to an evaporator for cooling supply air for a vehicle interior, in a specific refrigerating circuit branch of an air conditioning system. By means of an air control flap, the battery can also be cooled selectively by means of ambient air which is subsequently discharged outward again.

In a cooling system described in JP 11 040 212 A, a battery is cooled as a function of the temperature of the battery and of an outside air temperature either directly by means of outside air or else by means of air which is branched off from a supply air stream for a vehicle interior which is routed conducted through an evaporator of a vehicle air conditioning system.

JP 2002 352 866 A describes a cooling system having a cooling circuit and a refrigerating circuit which are coupled to one another via a refrigerant/coolant heat exchanger. Located in the cooling circuit are a battery to be cooled and an air/coolant heat exchanger for cooling the coolant by means of ambient air. The air/coolant heat exchanger can be bypassed by the coolant in a controllable way via a bypass line. An evaporator for cooling vehicle interior supply air is located in a refrigerating circuit branch parallel to the branch of the refrigerant/coolant heat exchanger. In this cooling system, the cooling of the battery may take place, on the one hand, via the air/coolant heat exchanger by means of ambient air and, on the other hand, via the refrigerant/coolant heat exchanger by means of the refrigerating circuit. In the refrigerating circuit, a changeover valve is provided, which controls whether the refrigerant flows via the refrigerant/coolant heat exchanger or via the evaporator for cooling the supply air.

It is the object of the invention to provide a cooling system and a cooling method, by means of which an effective cooling of a heat source, in particular a vehicle battery, is possible with high cooling energy efficiency.

SUMMARY OF THE INVENTION

In a cooling system, particularly a cooling system for motor vehicles, including a cooling circuit and a refrigerating circuit which are coupled to one another via a refrigerant/coolant heat exchanger and a third medium/coolant heat exchanger arranged in the cooling circuit, a heat source to be cooled is arranged in the cooling circuit and means are provided for controlling the quantity of coolant flowing through the refrigerant/coolant heat exchanger.

If no or only a low cooling power is required for the heat source to be cooled or if the cooling action by the third-medium/coolant heat exchanger is completely or largely sufficient, the coolant stream via the refrigerant/coolant heat exchanger can be reduced or completely shut off by these control means. The refrigerating circuit is thereby not influenced or scarcely influenced by the cooling circuit, and the energy requirement of the refrigerating circuit for coolant cooling can be kept to a minimum.

In an embodiment of the cooling system, the means for controlling the coolant stream includes a first bypass line for bypassing the refrigerant/coolant heat exchanger and a first control valve for the controllable apportionment of the coolant stream via the first bypass line and/or the refrigerant/coolant heat exchanger. As a result, even when the coolant stream is shut off completely, coolant circulation can be maintained via the refrigerant/coolant heat exchanger. Furthermore, the first control valve may be designed such that the coolant stream can be routed in variably definable fractions via the refrigerant/coolant heat exchanger or via the bypass line. This makes it possible, for example, to send through the refrigerating circuit only that fraction of the cooling power which cannot be provided via the third-medium/coolant heat exchanger. Moreover, due to the flexible adjustability of the cooling of the coolant by the refrigerating circuit, undesirably low temperatures and abrupt temperature fluctuations of the coolant can be reliably prevented.

In a particular embodiment of the cooling system, the means for controlling the coolant stream have a second bypass line for bypassing the third-medium/coolant heat exchanger and a second control valve for the controllable apportionment of the coolant stream via the second bypass line and/or the third-medium/coolant heat exchanger. This makes it possible to conduct the coolant stream completely or partially past the third-medium/coolant heat exchanger. This is expedient, for example, when the third medium, for example ambient air, has too high a temperature for cooling purposes. An undesirable rise in the coolant temperature and consequently in the cooling power requirements can thereby be avoided.

In a further embodiment, a section of the cooling circuit which is bridged by the second bypass line has, in addition to the third-medium/coolant heat exchanger, a second heat source to be cooled and a coolant pump. The section separated from the cooling circuit by the second control valve can therefore be used as a separate cooling circuit for the second heat source when the coolant stream of the cooling circuit of the first heat source is routed completely through the second bypass line. The cooling system can then be operated selectively with two cooling circuits, the first cooling circuit having the first heat source and the refrigerant/coolant heat exchanger and the second cooling circuit having the third-medium/coolant heat exchanger and the second heat source, or with a common cooling circuit which comprises all the components.

In a further embodiment of the invention, the coolant stream can, by the means for controlling the coolant stream, be controlled as a function of an actual temperature of the first heat source, of a desired temperature of the first heat source, of an actual temperature of the third medium and/or of an actual temperature of the coolant upstream and/or downstream of the first heat source. This makes it possible always to control the coolant stream optimally as a function of the particular situation. Thus, for example, the conduction of the coolant stream via the refrigerant/coolant heat exchanger can be prevented until a sufficient cooling of the first heat source by means of the third medium is no longer possible. Furthermore, for example as a function of the amount of the deviation of the actual temperature of the first heat source from its desired temperature, the coolant stream can be routed completely via the refrigerant/coolant heat exchanger, in order to approximate, as quickly as possible, the actual temperature to the desired temperature. Control as a function of the coolant temperature upstream or downstream of the first heat source makes it possible in a directed manner to conduct only a specific fraction of the coolant through the refrigerant/coolant heat exchanger, in order to avoid an excessive cooling of the heat source, for example a battery, and, possibly associated with this, damage to the heat source due to a cold shock. Too high a temperature gradient within the heat source can also be avoided by means of slow controlled cooling.

In a particular embodiment of the cooling system, the refrigerant/coolant heat exchanger is arranged in the refrigerating circuit downstream or upstream of an evaporator. In the former case, the refrigerant previously conducted via the evaporator flows through the refrigerant/coolant heat exchanger. What is achieved thereby is that the refrigerant in the evaporator deploys its normal cooling power, for example for cooling a supply air stream for a vehicle interior, and additionally also provides a moderate cooling power for the cooling circuit.

The method according to the invention serves for cooling a heat source which is part of a cooling circuit which is coupled via a refrigerant/coolant heat exchanger to a refrigerating circuit and which has a third-medium/coolant heat exchanger for heat coupling to a third medium. In terms of the method, an actual temperature of the heat source and/or an actual temperature of the third medium is determined and the quantity of coolant flowing via the refrigerant/coolant heat exchanger is set as a function of the determined actual temperature of the heat source, of the determined actual temperature of the third medium and/or of a predetermined desired temperature of the heat source. This method allows an always optimal cooling by means of the refrigerant/coolant heat exchanger and/or the third-medium/coolant heat exchanger.

Determining the actual temperature of the heat source delivers information as to whether, and to what extent, a cooling of the heat source is required. Determining the actual temperature of the third medium makes it possible to estimate whether the third medium has a temperature suitable for cooling and whether the cooling power which can be implemented via the third-medium/coolant heat exchanger is sufficient for cooling the heat source. These two temperature information items can be used individually or jointly to establish the quantity of coolant which needs to flow via the refrigerant/coolant heat exchanger. Thus, for example, the coolant quantity can be set very high via the refrigerant/coolant heat exchanger when the actual temperature of the heat source markedly overshoots the desired temperature and/or the actual temperature of the third medium is too high to allow a rapid cooling of the heat source. Depending on the application, an over-heating of the coolant caused a high actual temperature of the third medium to be compensated for by means of the refrigerating circuit, that is to say, cooling the third medium indirectly via the cooling circuit can be compensated for by means of the refrigerating circuit.

In a particular method of the invention, the quantity of coolant flowing via the refrigerant/coolant heat exchanger is reduced to zero when the actual temperature of the third medium falls below a pre-determinable limit temperature of the third medium which lies below the temperature of the heat source. What is achieved by this complete avoidance of the utilization of the refrigerant/coolant heat exchanger is that the refrigerating circuit is then relieved completely by the cooling circuit. This is expedient particularly when the temperature difference between the actual temperature of the third medium and the actual temperature of the heat source is high enough to ensure a sufficient cooling of the coolant by the third-medium/coolant heat exchanger. The limit temperature for cooling the coolant by means of the third-medium/coolant heat exchanger is preferably dependent on the desired temperature of the heat source, and possibly other items, for example on the required cooling rate.

The invention will become more readily apparent from the following description of advantageous embodiments thereof with reference to the accompanying drawings:

DESCRIPTION OF ADVANTAGEOUS EMBODIMENTS

Figure 1:
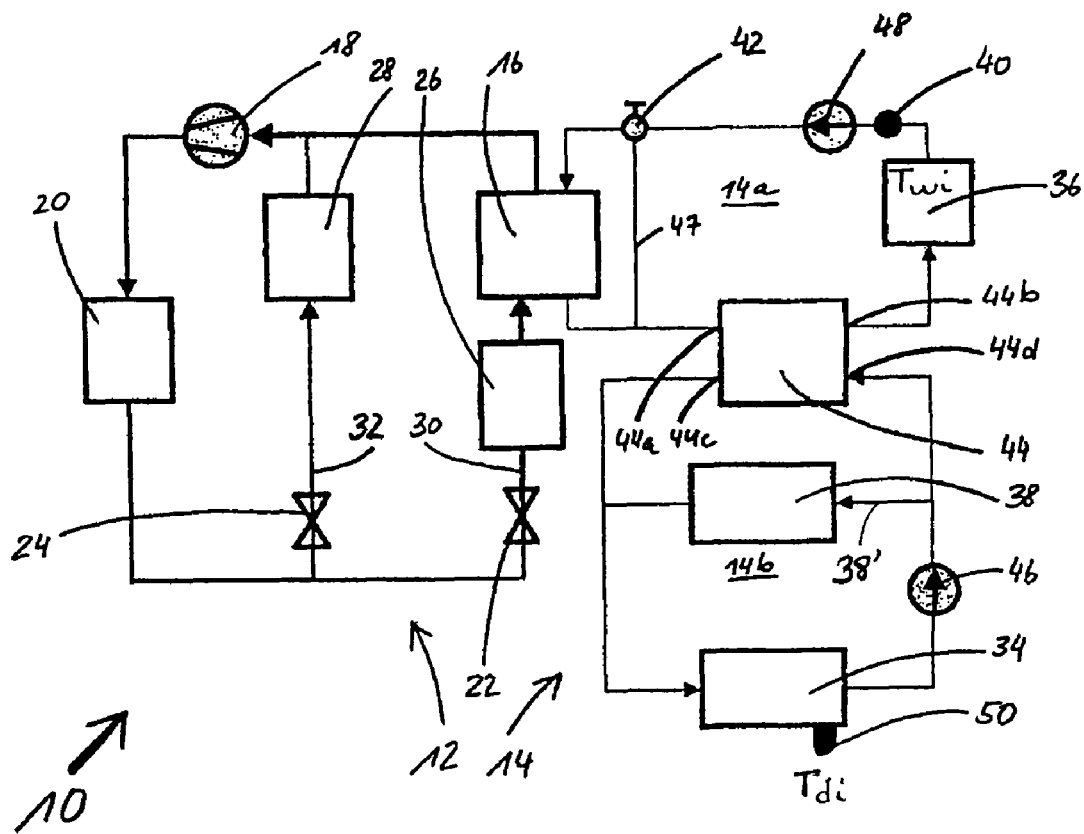
FIG. 1 shows, in an illustration in the form of a block diagram, a cooling system for a motor vehicle for cooling, inter alia, a battery.

The cooling system 10 shown in FIG. 1 comprises a refrigerating circuit 12, in which a conventional refrigerant circulates, and a cooling circuit 14, in which a conventional coolant, for example a water/glycol mixture, circulates. The refrigerating circuit 12 and the cooling circuit 14 are coupled via a common refrigerant/coolant heat exchanger 16. Furthermore, the refrigerating circuit 12 has a compressor 18 and a condenser 20 and is divided, downstream of the condenser 20, into two parallel branches 30, 32, each with an expansion valve 22, 24 and with an evaporator 26, 28. It thereby forms, in the customary way, a vehicle air conditioning system for the air conditioning of a vehicle interior, the two evaporators 26, 28 serving for cooling a front and a back supply air stream, respectively. The refrigerant/coolant heat exchanger 16 is arranged in series, on the refrigerant side, by one of the two evaporators 26, 28, here the evaporator 26 for the back supply air, in the associated refrigerating circuit branch 30. In another exemplary embodiment, not illustrated, the refrigerant/coolant heat exchanger precedes the evaporator. Alternatively, the refrigerant/coolant heat exchanger in the refrigerating circuit may also be designed without an evaporator arranged in series with it, and with an evaporator in a branch parallel to the branch of the refrigerant/coolant heat exchanger.

The cooling circuit 14 includes, as a heat source to be cooled, a battery 36 which, for example, may be a traction battery of a hybrid drive serving as a motor vehicle drive. The battery 36 is followed in the coolant, flow direction by a temperature sensor 40 for measuring the coolant temperature, by a first coolant pump 48 and by a first control valve 42. By means of this control valve 42, the coolant can be supplied in controllable fractions to the refrigerant/coolant heat exchanger 16 or be conducted past the latter via an assigned bypass line 47. The coolant subsequently arrives at a first inlet 44a of a second control valve 44 from which a first outlet 44b leads the coolant back to the battery 36.

The control valve 44 subdivides the cooling circuit 14 into a first section 14a, which includes the abovementioned cooling circuit components, and a second section 14b, in which a third-medium/coolant heat exchanger 34 and a second coolant pump 46 are arranged and which is coupled to a second inlet 44d and a second outlet 44c of the control valve. Furthermore, a second heat source 38 to be cooled is optionally arranged, parallel to the control valve 44, in the section 14b of the cooling circuit 14.

The first control valve 42 with the bypass line 47 and the second control valve 44 constitute, together with a conventional valve control unit, not shown, means for controlling the coolant stream. By their arrangement and suitable activation, they allow, depending on the system design and the requirements, a partial or complete bypassing of the refrigerant/coolant heat exchanger 16 and/or the third-medium/coolant heat exchanger 34. The valve control unit may be integrated, for example, into a central control apparatus, not shown, which controls all the components of the cooling system.

In the embodiment of the invention, as shown, outside air is used as a third medium for cooling the coolant in the third-medium/coolant heat exchanger 34. To measure the outside air temperature $T_{di}$, a second temperature sensor 50 is provided on the third-medium/coolant heat exchanger 34.

The cooling system serves, inter alia, for keeping the temperature $T_{wi}$ of the battery 36 within a specific temperature range between a minimum temperature $T_{ws,\ min}$ and a maximum temperature $T_{ws,\ max}$, for example between approximately 25° C. and approximately 35° C. The cooling of the battery 36 may take place by means of the refrigerant/coolant heat exchanger 16 and/or by means of the third-medium/coolant heat exchanger 34. Selection takes place by the means 42, 44, 47 for controlling the coolant stream.

The first control valve 42, determines what fraction of the coolant is conducted through the refrigerant/coolant heat exchanger 16 and what fraction of the coolant is conducted past the refrigerant/coolant heat exchanger 16 via the bypass line 47.

Figure 2:
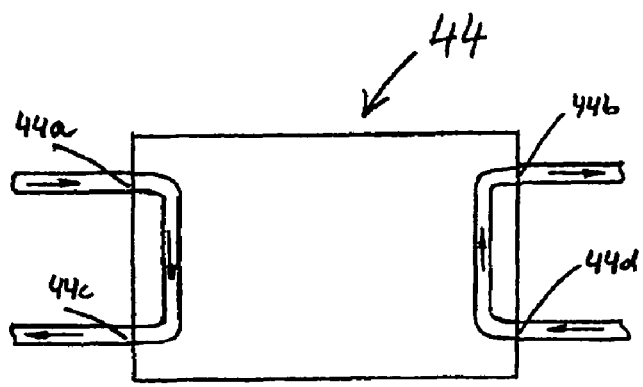
FIG. 2 shows a diagrammatic illustration of an adjustable control valve of the cooling system illustrated in FIG. 1, in a first setting.

The second control valve 44 makes it possible, by various possible settings, to conduct the coolant flowing in the first section 14a also in series through the second section 14b of the coolant circuit 14 or past this second section 14b and consequently past the third-medium/coolant heat exchanger 34. In a first setting, illustrated in FIG. 2, the first inlet 44a is connected to the second outlet 44c and the second inlet 44d is connected to the first outlet 44b. In a second setting, illustrated in FIG. 3, the first inlet 44a is connected to the first outlet 44b and the second inlet 44d and the second outlet 44c are shut off. In a third setting, illustrated in FIG. 4, the first inlet 44a is connected both to the first outlet 44b and to the second outlet 44c, and in this case it is possible to set what fraction of the coolant flowing through the first inlet 44a into the control valve 44 flows in each case to the first outlet 44b and to the second outlet 44c. Moreover, in this third setting, the second inlet 44d is connected to the first outlet 44b.

The diagrammatic illustrations of FIGS. 2 to 5 are to be understood as illustrations of the various possibilities for the flow connections of the inlets 44a, 44d and outlets 44b, 44c and the control valve 44 and not as a structural configuration of the control valve 44. The control valve 44 may be designed as one component or as being composed of various separate components, such as valves and lines. Thus, for this purpose, for example, a conventional bypass valve sold by the company Bosch, which possesses the required functionalities, may be used.

Thus, by means of the first control valve 42 and the second control valve 44, it is possible to define exactly what fraction of the coolant stream for battery cooling is conducted via the refrigerant/coolant heat exchanger 16 or past the latter and what fraction of the coolant stream is conducted via the third-medium/coolant heat exchanger 34 or past the latter.

By means of the cooling system of FIG. 1, the battery 36 can be cooled by the following method. The setting of the coolant stream conducted by respective heat exchanger 16, 34 takes place on the basis of the temperature values which are detected by the temperature sensors 40, 50. In this case, by means of the coolant temperature sensor 40, the temperature of the coolant after leaving the battery 36 is detected, and from this the temperature $T_{wi}$ of the battery 36 can be deduced. Alternatively, it is possible to use a temperature sensor directly in or on the battery 36 in order to detect the battery temperature $T_{wi}$. The detected battery temperature $T_{wi}$ and the detected outside air temperature $T_{di}$ are processed by the valve control unit or the control apparatus in order to set the control valves 42, 44 as a function of these.

Cooling of the coolant and consequently of the battery 36 solely by means of the outside air is possible if the measured temperature $T_{di}$ of the outside air is lower at least by a specific differential amount than the measured temperature $T_{wi}$ of the coolant or of the battery 36. For the abovementioned numerical example of the desired battery temperature range, this applies up to an outside air limit temperature $T_{dg}$ of approximately 20° C. The control valve 42 is then set such that the entire coolant stream is conducted past the refrigerant/coolant heat exchanger 16 via the bypass line 47 and via the control valve 44 to the third-medium/coolant heat exchanger 34. The second control valve 44 is given the setting of FIG. 2, in which the first inlet 44a and the second outlet 44c are connected to one another and in which the second inlet 44d and the first outlet 44b are connected to one another.

If the outside air temperature $T_{di}$ measured by the outside air temperature sensor 50 undershoots a particular threshold of, for example, 0° C., it is necessary to avoid the situation where the battery temperature $T_{wi}$ falls below the minimum desired temperature $T_{ws,\ min}$ of, for example, 25° C. For this purpose, the second control valve 44 can be given the setting of FIG. 4, in which only part of the coolant stream is conducted from the inlet 44a to the outlet 44c and consequently to the third-medium/coolant heat exchanger 34, while the other part of the coolant stream is conducted directly from the inlet 44a to the outlet 44b. Since in this case, too, no cooling by means of the refrigerant/coolant heat exchanger 16 is required, the refrigerating circuit 12 can be activated and deactivated independently of the cooling circuit 14 for the air conditioning of the vehicle interior.

Figure 3:
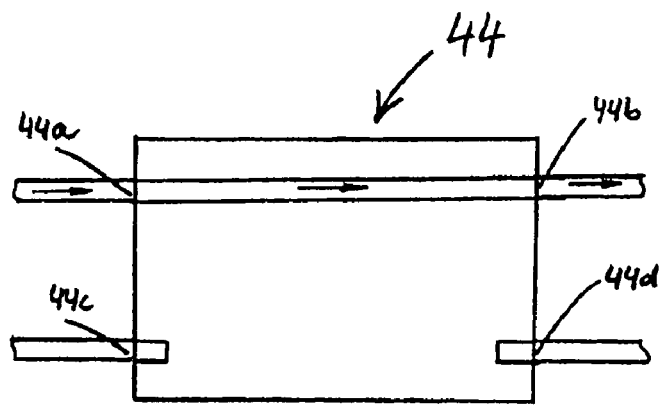
FIG. 3 shows the control valve of FIG. 2, in a second setting.
Figure 4:
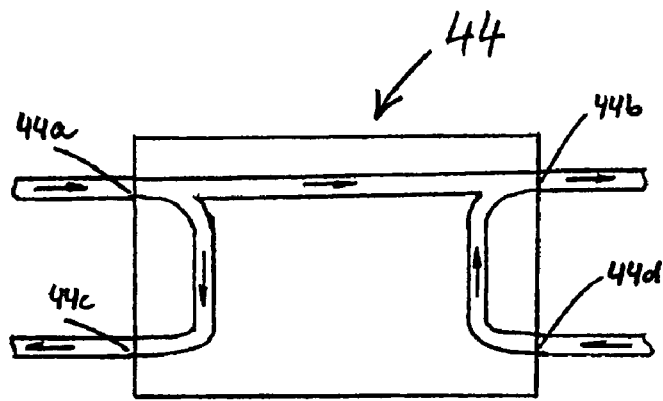
FIG. 4 shows the control valve of FIG. 2, in a third setting.

If the measured outside air temperature $T_{di}$ lies above the limit temperature $T_{dg}$ of, for example 20° C., suitable for cooling the battery 36, the second control valve 44 is switched to the setting of FIG. 3, in which the inlet 44a and the outlet 44b are connected to one another, whereas the outlet 44c and the inlet 44d are shut off completely. There is then no longer any connection between the two sections 14a, 14b of the cooling circuit 14 and the section 14b is closed via the second heat source 38 to be cooled. The first control valve 42 is set such that a specific fraction of the coolant stream is conducted via the refrigerant/coolant heat exchanger 16 as a function of the temperature detected by the coolant temperature sensor 40 or of the battery temperature $T_{wi}$. If a particularly high cooling power is required, it is also possible to route the complete cooling quantity via the refrigerant/coolant heat exchanger 16. In this position of the second control valve 44, the cooling of the battery 36 and/or of other comparable heat sources takes place solely via the refrigerant/coolant heat exchanger 16, that is to say by the refrigerating circuit 12, on account of too high an outside air temperature $T_{di}$.

The coolant is circulated through the two cooling circuit sections 14a, 14b by the respective coolant pumps 46, 48. Thus, in the section 14b, the heat source 38, for example power electronics, and, if appropriate, further heat sources which do not require such a low operating temperature as the one or more heat sources in the first section 14a, here the battery 36, can be cooled solely by means of ambient air. In particular, this section 14b may form a low ambient temperature cooling circuit for the vehicle.

Many modifications to the exemplary embodiment described are possible. For example, instead of the first control valve 42 at the branch to the bypass line 47, a control valve may also be arranged at the other end of the bypass line 47. As an alternative, a shut-off valve may be arranged in the bypass line 47. With the shut-off valve open, the coolant flows virtually solely through the bypass line 47 because it has a much lower flow resistance, than the refrigerant/coolant heat exchanger 16. Upon closing of the shut-off valve, the coolant is then conducted through the refrigerant/coolant heat exchanger 16.

In a design variant, not illustrated, the refrigerant/coolant heat exchanger 16 and the third-medium/coolant heat exchanger 34 are arranged in two parallel branches of the cooling circuit 14 provided with a single control valve, by means of which it is possible to control what fraction of the coolant is conducted through the branch having the refrigerant/coolant heat exchanger and what fraction of the coolant is conducted through the branch having the third-medium/coolant heat exchanger. In addition to the two parallel line branches having the refrigerant/coolant heat exchanger and the third-medium/coolant heat exchanger, the use of a third parallel cooling circuit branch in the form of a bypass line may also be considered. This allows a highly flexible setting of what fraction of the coolant, and how this fraction, is to be cooled.

In a further design variant not illustrated, additionally or alternatively to the bypass line of the refrigerant/coolant heat exchanger, a coolant pump with a controllable pumping power is provided as the coolant pump 48, so that the coolant stream via the refrigerant/coolant heat exchanger 16 and/or via the battery 36 can also be set by adjusting the pumping power.

Figure 5:
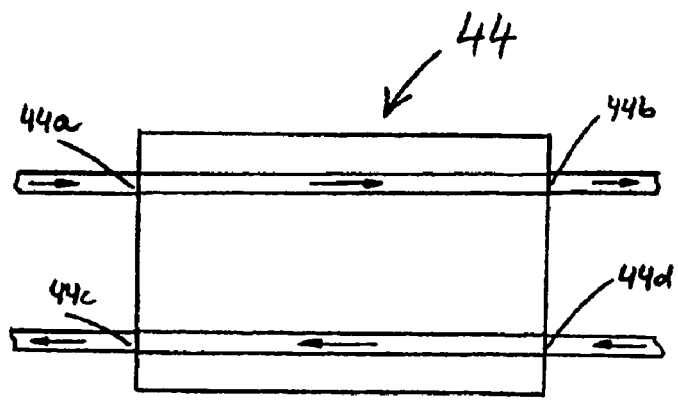
FIG. 5 shows the control valve of FIG. 2, in a modification of the second setting.

Furthermore, as a variant of the exemplary embodiment illustrated in FIG. 1, it is possible, in the second setting variant of the second control valve 44, to connect the inlet 44d to the outlet 44c, so that, with the cooling circuit sections 14a, 14b separated completely from one another, the cooling circuit section 14b is also closed via the second control valve 44. This setting of the second control valve 44 is illustrated in FIG. 5. It makes it possible to provide in the section 14b further heat sources which, when the sections 14a, 14b are connected in series, are connected in series to the battery 36.

It is also possible to arrange the refrigerant/coolant heat exchanger 16 on the refrigerating circuit side in a specific third branch parallel to the branches 30 and 32, preferably with a separate inlet expansion valve. In such an arrangement, it is expedient, if appropriate, to design this third branch so as to be separable from the remaining refrigerating circuit by means of a shut-off valve, so that the refrigerating circuit can be operated without influencing the cooling circuit.

Furthermore, it is possible to replace the control valve 44 by a further heat exchanger. The cooling of the heat source or of the battery would then take place via this coolant/coolant heat exchanger and the refrigerant/coolant heat exchanger 16.

With regard to the exemplary embodiment illustrated in FIG. 1, the two sections 14a, 14b of the cooling circuit 14 are then in heat-transmitting relationship via such a coolant/coolant heat exchanger.

As apparent from the exemplary embodiments described above, including the variants outlined, the invention allows an always optimal cooling of a heat source, such as a battery, on the one hand by means of a refrigerating circuit preferably being carried out only when, and insofar as, this is unavoidable. On the other hand, cooling takes place, as far as possible, solely or proportionately, by means of the third-medium/coolant heat exchanger.

Instead of the refrigerating circuit with two parallel branches which each contain an evaporator, unbranched refrigerating circuits or refrigeration circuits with more than two evaporators or more than one circuit with only one evaporator may also be used. A refrigerating circuit in which the refrigerant/coolant heat exchanger functions as an evaporator may likewise be expedient. Furthermore, the presence and arrangement of the components in the refrigerating circuit can be modified in a way known to a person skilled in the art, for example by means of a common expansion valve for all the evaporators, by means of shut-off and control valves for controlling the refrigerant flow and/or by the use of an orifice tube instead of an expansion valve.

The means of controlling the coolant stream according to the invention may contain a multiplicity of other components, such as further and other control and shut-off valves and also pumps. The presence and arrangement of the components in the cooling circuit may be changed within wide limits in the concept of the invention, particularly with regard to the position of the coolant pumps, of the heat sources and of the temperature sensors.

What is claimed is:

1. A cooling system, particularly for a motor vehicle, comprising:
   a refrigerating circuit (12),
   a cooling circuit (14) which is coupled to the refrigerating circuit (12) via a refrigerant/coolant heat exchanger (16), the coolant circuit (14) including a third-medium/coolant heat exchanger (34) and a first heat source (36) to be cooled, and
   means (42, 44, 47), by which the quantity of a coolant stream flowing via the refrigerant/coolant heat exchanger (16) can be controlled, including a first bypass line (47) for bypassing the refrigerant/coolant heat exchanger (16) and a first control valve (42) for the controllable apportionment of the coolant stream via at least one of the first bypass line (47) and the refrigerant/coolant heat exchanger (16), a second bypass line (38') for bypassing the third-medium/coolant heat exchanger (34) and a second control valve (44) for the controllable apportionment of the coolant stream via at least one of the second bypass line and the third-medium/coolant heat exchanger (34), the cooling circuit (14) further including a sub-section (14b) bridged by the second bypass line (38') and having, in addition to the third-medium/coolant heat exchanger (34), a second heat source (38) to be cooled and also a coolant pump (46) for circulating a coolant.

2. The cooling system (10) as claimed in claim 1, wherein the means (42, 44, 47) for controlling the coolant stream control the coolant stream as a function of an actual temperature of the first heat source (36), of a desired temperature of the first heat source (36), of an actual temperature of a third medium and of an actual temperature of the coolant at least at one of the upstream and the downstream sides of the first heat source (36).

3. A method for cooling a heat source (36) which is part of a first cooling circuit (14*a*), the first cooling circuit (14*a*) being coupled via a refrigerant/coolant heat exchanger (16) to a refrigerating circuit (12) and at least a third-medium/coolant heat exchanger (34) disposed in a second cooling circuit (14*b*) arranged in heat exchange relation with the first cooling circuit (14*a*) via a heat exchanger (44) for heat coupling to a third medium, said method comprising the steps of:

determining at least one of an actual temperature ($T_{wi}$) of the heat source (36) and an actual temperature ($T_{di}$) of the third medium in the third medium/coolant heat exchanger (34), and controlling the quantity of coolant flowing via the refrigerant/coolant heat exchanger (16) dependent on a function of at least one of the determined actual temperature ($T_{wi}$) of the heat source (36), of the determined actual temperature ($T_{di}$) of the third medium and in the third medium/coolant heat exchanger (34) a predetermined desired temperature ($T_{ws}$) of the heat source (36).

4. The method as claimed in claim 3, wherein the quantity of coolant flowing via the refrigerant/coolant heat exchanger (16) is reduced to zero when the actual temperature ($T_{di}$) of the third medium falls below a pre-determinable limit temperature ($T_{dg}$) of the third medium which lies below the temperature ($T_{ws}$) of the heat source (36).

* * * * *